(No Model.)
J. A. FELD & J. SIEBRECHT.
VESSEL FOR HOLDING LIQUIDS UNDER PRESSURE.
No. 400,318. Patented Mar. 26, 1889.
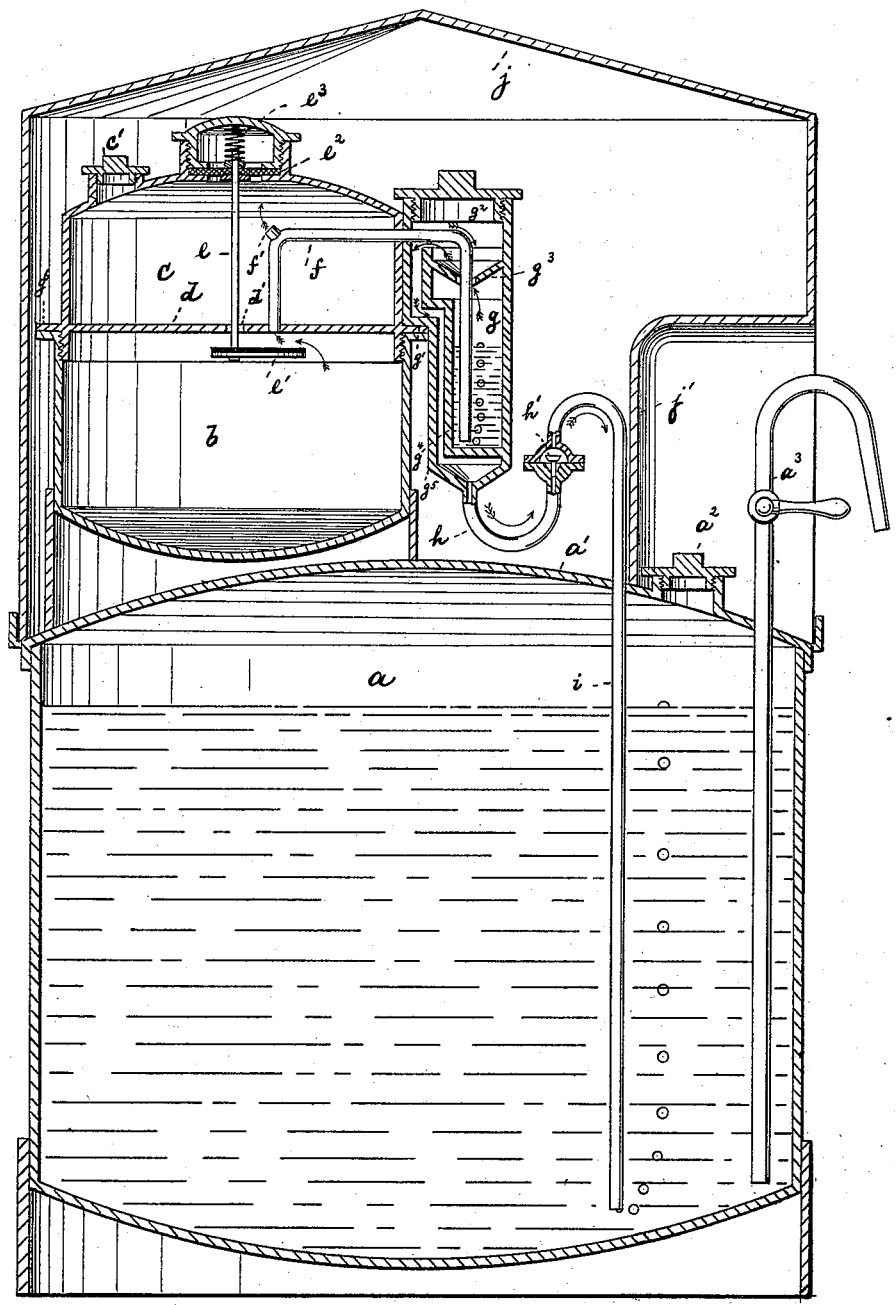
WITNESSES.
INVENTORS,

United States Patent Office.

JOHN A. FELD AND JOHN SIEBRECHT, OF NEW YORK, N. Y., ASSIGNORS OF ONE-THIRD TO JACOB MAYER, OF SAME PLACE.

VESSEL FOR HOLDING LIQUIDS UNDER PRESSURE.

SPECIFICATION forming part of Letters Patent No. 400,318, dated March 26, 1889.

Application filed November 23, 1888. Serial No. 291,694. (No model.)

*To all whom it may concern:*

Be it known that we, JOHN AUGUST FELD and JOHN SIEBRECHT, both of New York city, New York, have invented an Improved Vessel for Holding Liquids Under Pressure, of which the following is a specification.

This invention relates to an improved vessel in which beer and other beverages may be held under the pressure of carbonic-acid gas. The invention is intended more particularly for household use, in that a comparatively small quantity of beer can be kept fresh for a long period of time; but the invention may also be applied to larger vessels.

It consists in the various features of improvement, more fully pointed out in the claim.

The accompanying drawing represents a vertical central section of our improved vessel.

The letter $a$ represents a vessel for holding beer or other beverages, and closed by cover $a'$. This cover has a filling-opening, $a^2$, and a discharge-faucet, $a^3$. Above cover $a'$ there is placed a pair of superposed chambers or vessels, $b$ $c$, separated by bottom $d$, having a small opening, $d'$, by means of which the chambers communicate. The lower chamber, $b$, is for the reception of bicarbonate of soda, and the upper chamber, $c$, for the reception of diluted sulphuric acid.

$c'$ is a filling-opening for chamber $c$.

Through the opening of bottom $d$ there passes a valve-stem, $e$, carrying valve $e'$ at its lower end, and secured to an elastic diaphragm, $e^2$, at its upper end, the latter being counteracted by spring $e^3$.

$f$ is a tube opening into chamber $b$ and passing through chamber $c$, where it is provided with an opening, $f'$, above the acid-level. The tube $f$ at its free end is bent downward and passes into a chamber, $g$, where it terminates a short distance above the bottom. The chamber $g$ has a shoulder, $g'$, that sets upon a flange, $g^6$, of vessel $c$. At its upper end the chamber $g$ has the screw-plugged opening $g^2$, through which water may be poured into the chamber. The carbonic-acid gas evolved in chamber $b$ by the mixture of the chemicals is conducted by tube $f$ to the bottom of chamber $g$. Thence it rises through the water in said chamber, to be washed. Within the chamber $g$ there is placed the funnel $g^3$, having a central opening. This funnel permits the water to be properly poured in, and at the same time it permits the rising of the gas. Arrived at the upper end of chamber $g$, above the water-level, the gas passes down between the double walls $g^4$ $g^5$ of such chamber. Thence the gas passes into the tube $h$, having a check-valve, $h'$, that is to prevent back-pressure, and finally it enters a tube, $i$, which conducts it to near the bottom of vessel $a$. Within this vessel the gas rises to the top of the liquid, where it exerts a pressure that forces the liquid out of faucet $a^3$ when the latter is opened. The superstructure upon vessel $a$—that is, the chambers $b$, $c$, and $g$—are inclosed by a removable cover, $j$, which has the offset $j'$. This offset permits ready access to the filling-opening $a^2$ and to the discharge-faucet $a^3$ of vessel $a$.

The operation of the apparatus will be readily understood. The gas is formed and washed, and is then conducted to the vessel $a$, where it acts upon the liquid contents of the latter. Should at any time the formation of gas be too rapid, it will, through opening $f'$, act upon diaphragm $e^2$. The latter, on being forced upward, will close the valve $e'$ against opening $d'$ and against the mouth of tube $f$, the valve being of a size to extend across both said openings.

What we claim is—

The combination of vessel $a$ with the vessels $b$ $c$, tube $f$, vessel $g$, having double walls $g^4$ $g^5$, and offset $g'$, resting upon flange $g^6$ of vessel $c$, and with the tubes $h$ $i$, substantially as specified.

JOHN A. FELD.
JOHN SIEBRECHT.

Witnesses:
F. V. BRIESEN,
WILLIAM WAGNER.